United States Patent
Zeng et al.

(10) Patent No.: US 6,598,671 B1
(45) Date of Patent: Jul. 29, 2003

(54) HYBRID HEATING SYSTEM AND METHOD FOR VEHICLES

(75) Inventors: Xin Zeng, Auburn Hills, MI (US); Gregory Alan Major, Beverly Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/534,062

(22) Filed: Mar. 24, 2000

Related U.S. Application Data
(60) Provisional application No. 60/173,456, filed on Dec. 29, 1999.

(51) Int. Cl.[7] .................... F25B 29/00; B60H 1/00; B60H 3/00
(52) U.S. Cl. .............. 165/240; 165/242; 165/241; 165/42; 165/43; 165/262; 165/256; 165/202; 237/2 B; 237/12.3 B; 237/2 A
(58) Field of Search ............... 165/240, 241, 165/242, 42, 43, 262, 256, 202; 62/196.4; 237/2 A, 2 B, 12.3 B

(56) References Cited

U.S. PATENT DOCUMENTS

| | | | | |
|---|---|---|---|---|
| 2,902,220 A | * | 9/1959 | Myck, Jr. et al. ........... 165/262 |
| 3,677,335 A | * | 7/1972 | Weatherston ............... 165/262 |
| 3,709,289 A | * | 1/1973 | Weatherston ............... 165/262 |
| 3,797,560 A | * | 3/1974 | Zaharoni .................... 165/256 |
| 4,308,994 A | * | 1/1982 | Perhats ................... 237/12.3 B |
| 4,391,407 A | * | 7/1983 | Nakazawa ............. 237/12.3 B |
| 4,821,792 A | * | 4/1989 | Bednarek .................... 165/43 |
| 5,291,941 A | * | 3/1994 | Enomoto et al. ........... 237/2 B |
| 5,291,960 A | * | 3/1994 | Brandenburg et al. .. 237/12.3 B |
| 5,299,631 A | * | 4/1994 | Dauvergne .................. 165/240 |
| 5,497,941 A | * | 3/1996 | Numazawa et al. ........ 237/2 A |
| 5,678,761 A | * | 10/1997 | Ikeda ........................ 237/2 B |
| 5,971,289 A | * | 10/1999 | Kurahashi et al. .......... 237/2 B |
| 6,032,869 A | * | 3/2000 | Ito et al. ................ 237/12.3 B |
| 6,082,626 A | * | 7/2000 | Morikawa et al. ..... 237/12.3 B |
| 6,105,375 A | * | 8/2000 | Takano et al. ............. 62/196.4 |
| 6,164,367 A | * | 12/2000 | Kurahashi et al. .......... 237/2 B |
| 6,269,872 B1 | * | 8/2001 | Anderson .............. 237/12.3 B |

FOREIGN PATENT DOCUMENTS

| | | | | |
|---|---|---|---|---|
| JP | 64-9014 | * | 1/1989 | |
| JP | 406048153 | * | 2/1994 | ................. 165/240 |
| JP | 406193972 | * | 7/1994 | ................. 165/240 |
| JP | 11-170848 | * | 6/1999 | |

* cited by examiner

*Primary Examiner*—John K. Ford
(74) *Attorney, Agent, or Firm*—Christopher DeVries

(57) ABSTRACT

An apparatus for heating the interior compartment of a vehicle, the apparatus has a primary heating system, a secondary heating system and an operating system. The primary heating system receives and circulates an engine coolant through a heater core. The secondary heating system receives and circulates a gas, the secondary heating system heats the gas and circulates the heated gas through a heat exchanger. The operating system for operating the heating systems, the operating system receives a plurality of inputs and in response to the inputs the operating system determines which of the heating systems is to be activated in response to a heating request. The operating system also determines whether or not to deactivate one or both of the heating systems.

8 Claims, 5 Drawing Sheets

Assessment of System Operating Strategy

| | Power Comsumption W | Availability | Operating Difficulty | Efficiency | Ambient Temperature |
|---|---|---|---|---|---|
| Heat Pump System | 1180 | Very High | Very Low | Very High | 20 |
| Heat Core System with Pump | 21 | Very High | Very Low | Very High | 20 |
| Heat Pump System | 1700 | High | Low | High | 10 |
| Heater Core System with Pump | 21 | High | Very Low | High | 10 |
| Heat Pump System | 2260 | Low | High | Low | 0 |
| Heater Core System with Pump | 21 | Low | Low | High | 0 |
| Heat Pump System | 2800 | Very Low | Very High | Very Low | -10 |
| Heater Core System with Pump | 21 | Very Low | Very Low | High | -10 |

FIG. 4

Potential Hybrid Heating System Operating Modes

| | Heater Core Only Heating Loop 12 | Heater Core Only Heating Loop 14 | Engine Off Recirc. Pump Only Heating Loop 12 | Heater Core + Heat Pump Loops 12 & 14 | Engine Off Recirc. Pump + Heat Pump Loops 12 & 14 |
|---|---|---|---|---|---|
| Normal Temp (> 5 C) Steady-State Operation | X | | | | |
| Normal Temp p (> 5 C) Transient Operation | | X | X | | |
| Low Temp (< 5 C) Steady-State Operation | X | X | X | X | |
| Low Temp (< 5 C) Transient Operation | | | | X | X |

FIG. 5

HYBRID HEATING SYSTEM AND METHOD FOR VEHICLES

This application claims the benefit of a provisional application filed on Dec. 29, 1999, entitled: Hybrid Heating System and Method for Vehicles, Ser. No. 60/173,456. The contents of which are incorporated herein by reference.

FIELD OF INVENTION

The present invention is related to a vehicles heating system.

BACKGROUND

Passenger comfort and fuel efficiency have set forth increasing demands on automotive heating, ventilating and air-conditioning (HVAC) systems. It is a primary goal of most HVAC systems to provide a more efficient means for providing climate control to an automobile.

As a result, newer and improved automotive HVAC systems are configured to make use of available energy sources without placing an additional load onto the vehicle system.

Presently, automotive vehicles are supplied with heating systems that utilize heat produced by the vehicle's engine. The system includes a heater core configured to disapate heat into the vehicles HVAC system. Water or engine coolant that is heated by the engine is transported through a conduit from the engine block to the heater core.

A user controlled variable speed fan is positioned upstream from the heater core. The HVAC system typically includes a path which extends directly through the heater core as well as a parallel path which bypasses the heater core with an adjustably positioned vent door to control the amount of air directed through the heater core.

In vehicles having relatively large engines, such as 6 or 8 cylinder engines, the engine size is considered large enough to provide a sufficient amount of heat to the passenger compartment. However, the engine must be first warmed up to provide a source of heat.

However, the time required to heat an engine up to its operational temperature may take several minutes. Moreover, the actual time required may vary in accordance with the size and type of engine as well as the outside temperature.

Vehicles that have smaller or more fuel efficient engines, are sometimes unable to produce enough heat even when they have reached their operational temperature. This is particularly true on extremely cold days when the ambient temperature is well below freezing. Accordingly, and as automobiles become more fuel efficient, they generate less heat.

In addition, and during regular operation, if an engine is set into an idling mode, the engine runs at a lower rpm. This may also cause engine to generate less heat which ultimately causes less heat to be transferred to the interior of the automobile.

Diesel engines are particularly susceptible to this problem as there is a much greater difference between the heat produced at an idle versus the heat generated during regular operation.

Additionally, and when an engine is shut off after it has been running at its operational temperature, the engine's heat is no longer transferred to the vehicle's heating system since the water pump which is driven by the engine through mechanical linkage is unavailable to be operated.

SUMMARY OF THE INVENTION

It is therefore an object of the invention to provide an improvement in the performance of a heating system of an automotive vehicle.

Another object is to provide a method and apparatus for supplementing and/or improving the heating system of an automotive vehicle.

Another object of the present invention is to provide a method and apparatus for improving the heating system of an automobile without affecting the energy load and accordingly the fuel efficiency of the automobile engine.

Another object of the present invention is to provide a method and apparatus for improving the heating system of an automobile without affecting the cabin air temperature control quality. (The dynamic changes of hybrid vehicle propulsion modes result in unpredictable switching from one heating loop to the others. Cabin supply air temperature tends to be unstable and less controllable as a result of alternating the heat sources).

BRIEF DESCRIPTION OF THE DRAWINGS

Other objects, features, advantages and details of the present invention appear in the following detailed description of preferred embodiments of the invention, the detailed description referring to the drawings in which:

FIG. 4 is a chart illustrating efficiencies and operating parameters of the present invention;

FIG. 5 is a chart illustrating operational configurations of the present invention.

DESCRIPTION OF THE PREFERRED EMBODIMENTS

Figure 1:
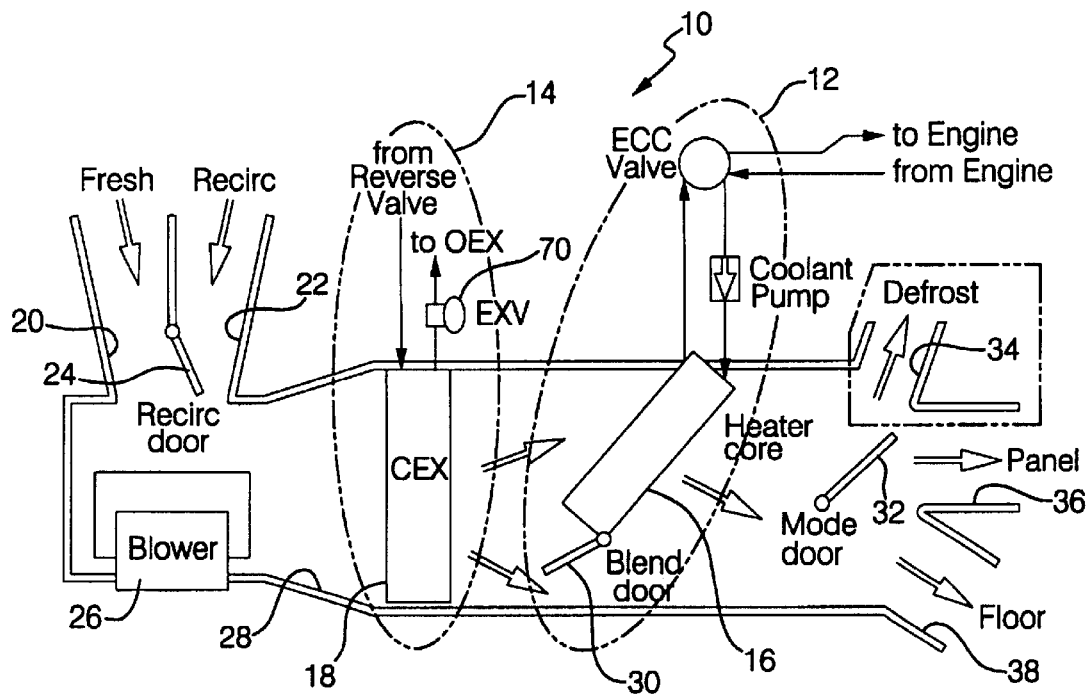
FIG. 1 is a diagram of a heating system constructed in accordance with the present invention.

Referring now to FIG. 1, a hybrid heating system 10 is illustrated. Hybrid heating system 10 has a first heating loop 12 and a second heating loop 14. First heating loop 12 receives and circulates an engine coolant through a heater core 16. Second heating loop 14 provides heat to the vehicles interior through a cabin heat exchanger 18.

Generally, hybrid heating system 10 receives an air input from a fresh air passage 20 and a recirculation air passage 22. An air circulation door 24 controls the mixture of the fresh to recirculation air that is inputted into the system. A blower or fan 26 forces the fresh and/or recycled air into a main trunkline 28 that contains cabin heat exchanger 18 and heater core 16.

In accordance with the present invention, cabin heat exchanger 18 and/or heater core 16 heat the air flowing through heating system 10 in accordance with the heating system settings.

Heater core 16 is positioned down stream from cabin heat exchanger 18. A blend door 30 is positioned to direct the air to and/or away from heater core 16 after it has passed through cabin heat exchanger 18.

A mode door 32 is positioned to direct the air or a portion thereof to a defog pathway 34, a panel pathway 36 or a floor pathway 38.

Figure 2:
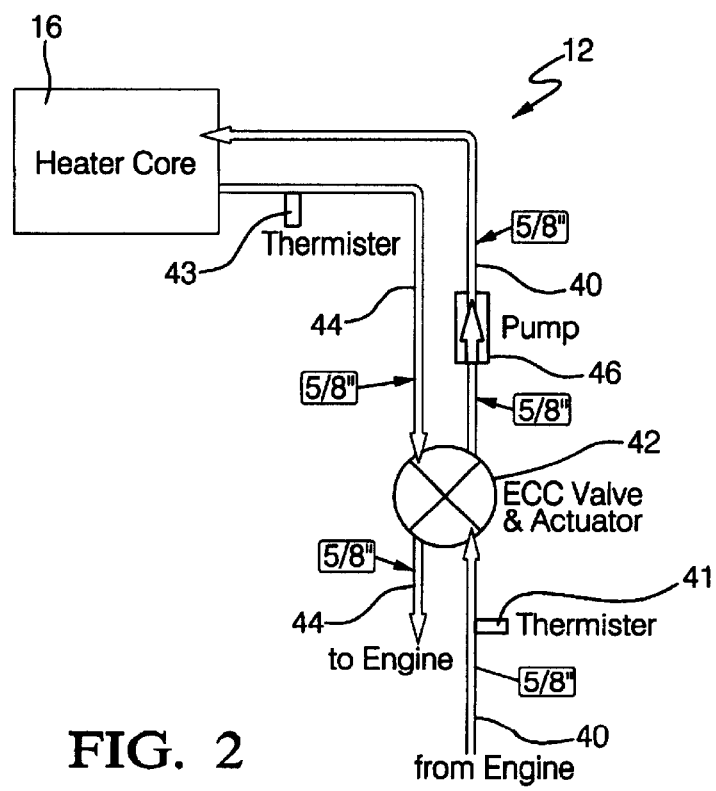
FIG. 2 is a diagram of component parts of the present invention.

Referring now to FIGS. 1 and 2, component parts of first heating loop 12 are illustrated. A supply conduit 40 is configured to supply engine coolant from an engine block (not shown) to heater core 16. An electronic coolant control (ECC) valve 42 is positioned at a point on conduit 40 to regulate the flow of the engine coolant to and from heater core 16 or by-pass the heater core.

A return conduit 44 is configured to return the engine coolant from heater core 16 to an engine block (not shown). Return conduit 44 also passes through electronic coolant control valve 42. In the preferred embodiment conduits 40 and 44 are constructed out of rubber hoses having a diameter of approximately ⅝ inches.

A coolant flow pump 46 is positioned at a point on conduit 40 to maintain the flow of engine coolant through first heating loop 12 in response to a predetermined protocol. Coolant flow pump 46 is activated in situations where the automobile engine slows down or is shut off and the flow of the engine coolant from the engine to heater core 16 is slowed or stopped.

Electronic coolant control valve 42 controls the flow of the engine coolant through first heating loop 12. In particular, electronic control valve 42 regulates the flow of the engine coolant through heater core 16.

A supply thermister 41 is positioned to react in response to the temperature of the engine coolant as it passes through conduit 40 towards electronic control valve 42.

A return thermister 43 is positioned to react in response to the temperature of the engine coolant as it passes from heater core 16 through conduit 44 towards electronic control valve 42.

Thermisters 41 and 43 provide temperature dependent inputs to a control algorithm which, in response to the temperature dependent inputs of thermisters 41 and 43 sends a control signal to either or both electronic control valve 42 and coolant flow pump 46.

For example, if the temperature of the engine coolant is not at the desired heating temperature, thermister 41 will send a signal to the control algorithm which will send a signal to electronic control valve 42 to maintain electronic control valve 42 in a closed position whereby the flow of the engine coolant circulates from conduit 40 to conduit 44 until the temperature of the coolant is within the desired range. Once the engine coolant has reached the desired range, electronic control valve 42 is now opened.

Thermister 43 reacts in response to the temperature of the engine coolant as it passes through heater core 16. The positioning of thermisters 41 and 43 provides the control algorithm with an engine coolant temperature differential after it has passed through heater core 16 and provided heat to the air that passes through heater core 16.

In addition, and if the temperature of the engine coolant is at or above the desired heating temperature and the flow of the engine coolant is slowed or stopped as discussed herein and above, coolant flow pump 46 is actuated to maintain the flow of the engine coolant through heater core 16.

Coolant flow pump 46 is activated by a control signal received from the control algorithm.

This is of particular importance in situations where the engine has been running for a period of time and the engine coolant is at a desired heating temperature and engine is idling or shut down.

Conversely, and when the temperature of the engine coolant falls below the desired temperature, coolant flow pump 46 will be shut off and/or deactivated.

This configuration allows heating system 10 to utilize the waste heat from an automobile engine after the normal operation of the engine ceases to maintain the flow of the engine coolant through first heating loop 12.

Figure 3:
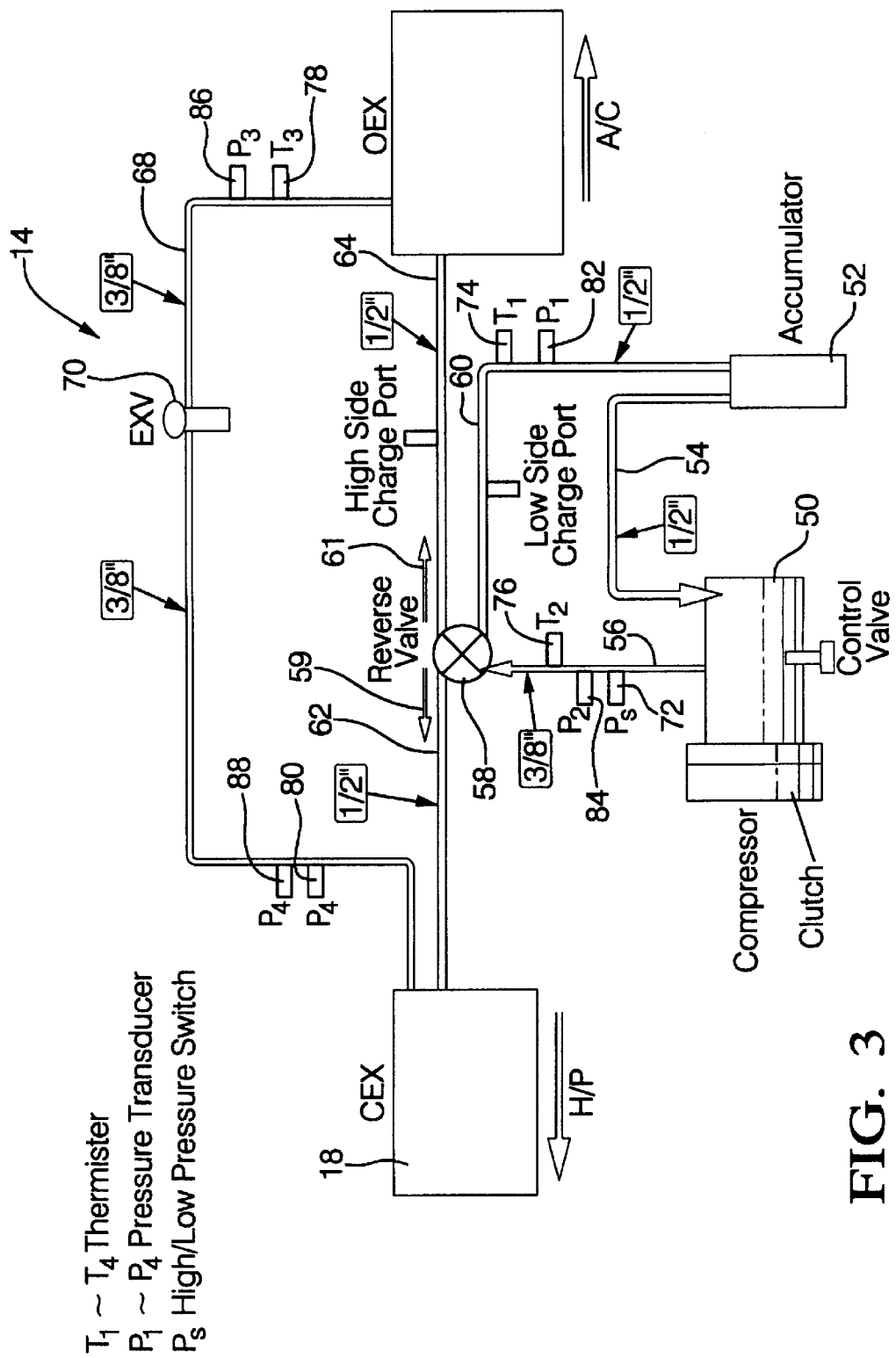
FIG. 3 is a diagram of component parts of the present invention.

Referring now to FIGS. 1 and 3, second heating loop 14 is illustrated. Second heating loop 14 provides heat to the cabin in situations when the engine is not running or the engine coolant temperature is less than the desired heating temperature or the engine is unable to provide necessary heating requirements for the cabin area of the vehicle.

A compressor 50 receives an automobile refrigerant from an accumulator 52. In the preferred embodiment, automobile refrigerant is an automobile refrigerant gas 134A; however, other gases such as carbon dioxide, hydrogen etc. can be used.

A conduit 54 connects compressor 50 to accumulator 52. In the preferred embodiment, conduit 54 is ½" in diameter and is constructed out of a rubber material having flexible characteristics. The flexible characteristics of conduit 54 allow compressor 50 to vibrate in accordance with normal operation procedures without damaging conduit 56 and without transferring the vibration and noise to the other parts of the system or vehicle.

Compressor 50 receives and compresses the automobile refrigerant gas, which, in accordance with Boyle's law, causes the temperature and pressure of the automobile refrigerant to increase. Once the temperature and pressure of the automobile refrigerant has been increased to the desired temperature and pressure, the automobile refrigerant is transferred through a conduit 56 to a reverse flow valve 58. The positioning of reverse flow valve 58 determines the flow of automobile refrigerant gas to second heating loop 14. For example, if reverse flow valve 58 is set to a heating position, the automobile refrigerant gas will flow in the direction of arrow 59. Conversely, if reverse flow valve 58 is set to an air-conditioning position, the gas will flow in the direction of arrow 61.

In the preferred embodiment conduit, 56 is ⅜" in diameter and is also constructed out of a flexible material such as rubber.

Reverse flow valve 58 is also connected to a conduit 60, a conduit 62 and a conduit 64.

Conduit 60 is connected to reverse flow valve 58 at one end and accumulator 52 at the other. Conduit 60 is also ½ inch in diameter and is constructed out of aluminum.

Conduit 62 is connected to reverse flow valve 58 at one end and cabin heat exchanger 18 at the other. Conduit 64 is connected to reverse flow valve 58 at one end and an outside heat exchanger 66 at the other end. Conduits 62 and 64 are ½ inch in diameter and are also constructed out of aluminum.

A conduit 68 is connected to cabin heat exchanger 18 at one end and outside heat exchanger 66 at the other. In the preferred embodiment, conduit 68 is ⅜ of an inch in diameter and is also constructed out aluminum.

An electronic expansion valve 70 is positioned to provide a pressure drop that reduces the pressure of the automobile refrigerant and manages the flow rate of the refrigerant as it flows through conduit 68. A high low-pressure switch 72 is positioned to activate compressor 50. A plurality of thermisters 74, 76, 78 and 80 are positioned to have their characteristics varied in accordance with the temperature of the automobile refrigerant gas as it flows through second heat loop 14.

In addition, a plurality of pressure transducers 82, 84, 86 and 88 are also positioned to have their characteristics varied in accordance with the pressure of the automobile refrigerant gas as it flows through second heat loop 14.

Thermisters 74, 76, 78 and 80 provide temperature dependent responses to the control algorithm of heating system 10. Similarly, pressure transducers 82, 84, 86 and 88 provide pressure dependent responses to the control algorithm. Accordingly, the control algorithm of the present invention sends control signals to second heating loop 14 in response to inputs from the thermisters and the pressure transducers.

Compressor 50 is supplied with a mechanical operational force through the use of a clutch mechanism (not shown) that is coupled to the vehicles drivetrain. Accordingly, and when the vehicle is operating, second heat loop 14 receives some, if not all, of its required energy from the operational parts of the vehicle.

In situations where the automobile is not running, compressor 50 will derive its energy from an electrical source such as a battery.

This battery may be configured to receive a charge from a multipurpose unit (MPU), which is also configured to convert the mechanical force of the automobile's drivetrain into an electrical charge.

Accordingly, and as contemplated with the present invention, first heating loop 12 and second heating loop 14 work in unison to provide heat to the internal cabin of a vehicle.

For example, and in startup situations when the vehicle's engine has been off for an extended period of time and the internal area requires heating, second heating loop 14 is activated to provide heat to the passenger compartment. Heating loop 14 will be activated to provide heat to the passenger compartment until the temperature of the engine coolant has reached an acceptable level for transference of the engine coolant's heat to heater core 16.

However, it is noted that the energy load required to operate second heating loop 14 is substantially higher than that required to operate first heating loop 12. Accordingly, and in accordance with the present invention, second heating loop 14 is deactivated once first heating loop 12 can sufficiently supply the heating requirements of the vehicle.

Second heating loop 14 will provide heat to the passenger compartment until the temperature of the engine coolant has reached an operational temperature. Accordingly, and when the heating coolant is at a desired heating temperature, second heating loop 14 will be deactivated and the required heat will be provided by first heating loop 12.

Moreover, and through the use of a plurality of temperature and pressure sensors, second heating loop 14 may be activated to supplement or replace the heating demand of first heating loop 12.

The monitoring of the passenger compartment as well as the temperatures of heating loops 12 and 14 prevents inefficient switching from one heating system to another that will cause excessive power consumption.

For example, and referring now to FIG. 4, a chart illustrating the power consumption and efficiency of heating loops 12 and 14 in response to outside temperatures, is illustrated.

Referring now to FIG. 5, a chart illustrating possible operational configurations of heating loops 12 and 14 is illustrated.

Figure 6:
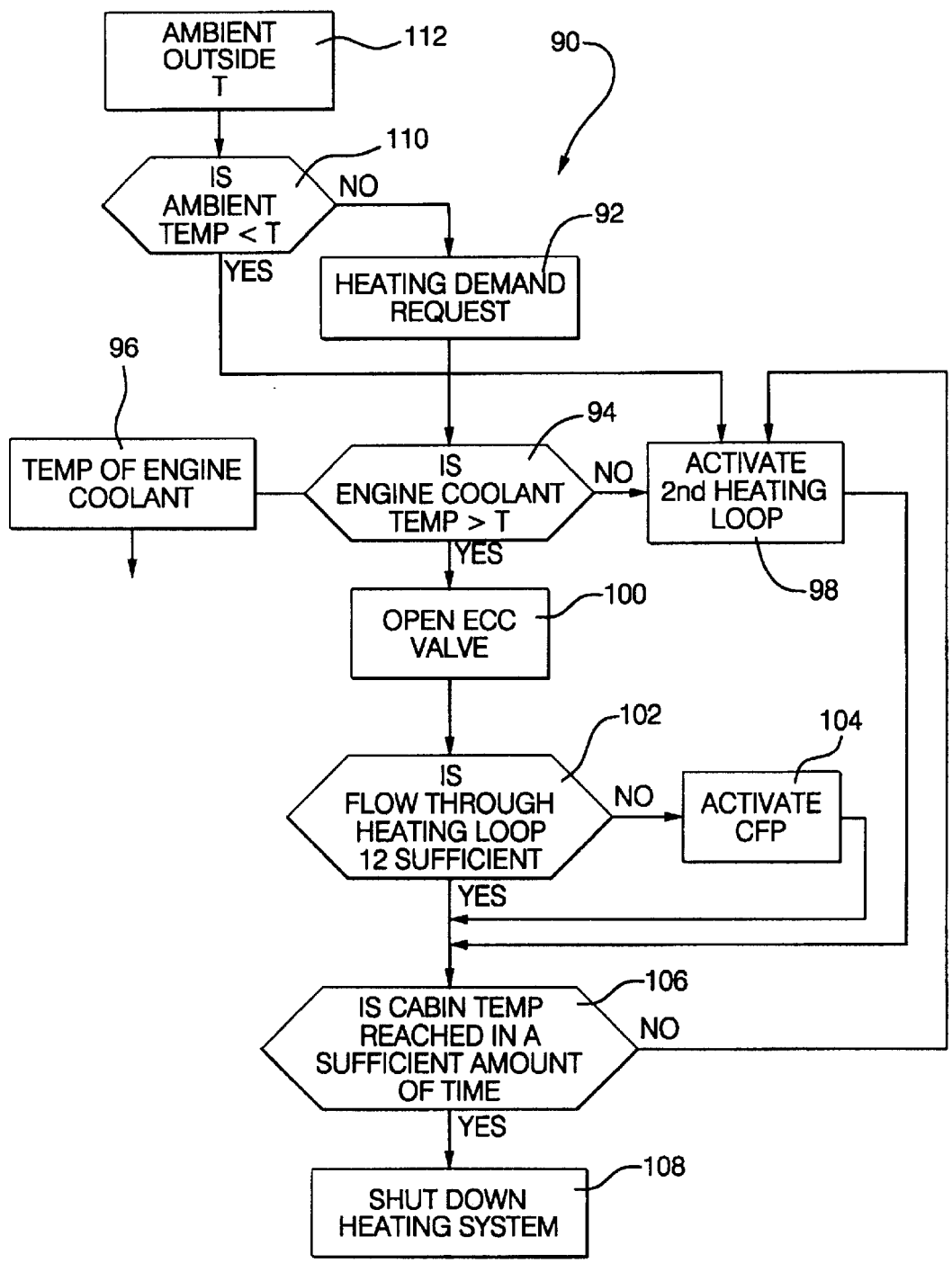
FIG. 6 is a flow chart generally illustrating a control algorithm for use with the present invention.

Referring now to FIG. 6, a flow chart illustrates a possible command sequence of a control algorithm 90 configured for use in accordance with the present invention.

Here a heating demand request 92 is received by control algorithm 90. A first lower-level decision pathway 94 receives an engine coolant temperature input 96 and determines whether the temperature of the engine coolant is above or at the desired heating range.

Temperature input 96 will receive its input from thermisters 41 and 43.

If the temperature of the engine coolant is not at the prescribed range, second heating loop 14 is activated through a command request 98. If the temperature of the engine coolant is at the prescribed range, electronic control valve 42 is opened in response to a command request 100.

A mid-level decision pathway 102 determines whether the automobile engine is idling or is shut off. If it is shut off, a command request 104 activates coolant flow pump 46.

A high level decision pathway 106 determines whether the temperature of the passenger compartment of the vehicle reaches the desired temperature in accordance with the heater demand request 92. In addition, decision pathway 106 also determines whether the temperature has been reached within a prescribed period of time. If so, a command request 108 submits a signal to shut down either or both of the heating loops.

If the desired temperature has not been reached within the prescribed period of time, decision pathway 106 submits an activation signal to command request 98.

As an alternative, and where the limit of the vehicles engine or the heating loads of first heating loop 12 is predetermined by the ambient temperature of the outside air, control algorithm 90 is configured to receive have a pre-heating request decision pathway 110 which receives an outside temperature input 112.

Decision pathway 110, in accordance with predetermined heating limits of the vehicle, determines which is the most efficient heating arrangement for heating system 10.

For example, and if the ambient outside temperature is below a predetermined value, which in accordance with the heating limits of the vehicles engine, decision pathway 110 will supersede decision pathway 106 as the temperature of the passenger compartment of the vehicle, and will never reach the requested temperature without activating secondary heating loop 14. Therefore, decision pathway 110 will automatically activate second heating loop 14.

Accordingly, control algorithm 90 provides an operational protocol to first and second heating loops 12 and 14 to provide an optimum heating configuration for a vehicle. Control algorithm 90 is configured to maximize the use of the waste heat produced by the vehicle's engine.

In addition, the present invention also provides a heating system whereby the passenger compartment of a vehicle is provided with a secondary heating source that is not depended upon the vehicles engine and, accordingly, does not have the operational deficiencies of a vehicle heating system based solely upon the engine's waste heat output.

Moreover, the present invention also provides an efficient means for implementing the secondary heating source, which requires a much greater source of energy.

In contrast, and without the utilization of a control algorithm 90, switching from a coolant heating system to a heat pump system may cause unstable cabin temperature variations as both of these systems may operate at differing temperatures, including initial startup, ambient or running temperature, as well as having differing temperature gradients from startup to equilibrium.

Impacts of Ambient Temperature on Operating Modes

The idea behind the study of the potential operating modes in a hybrid heating system is to guide the design and control optimization by identifying the boundary conditions of overall system operations and understanding the complicated interactions between the internal subsystems and environment. A subjective assessment of the impacts of the ambient temperature on the heating needs, power consumption, efficiency, and availability at various operating modes of the hybrid heating has been identified in Table 1.

operated at a lower ambient condition with respect to the individual operation. Aside from meeting the needs of low temperature operation, there is plenty of available heating capacity from either heat core or heat pump towards the high ambient temperature, but the needs reduce substantially. With the increase of ambient temperature, efficiency of single and hybrid operations increases and the power consumption decreases, as illustrated in Table 1.

Considering its characteristic feature of high energy efficiency, heater core is always prioritized in the hybrid heating system as a primary heating operation whenever it is available, while the heat pump is utilized as a supplemental operation. However, heat pump also plays an important role of improving thermal comfort by its rapid heating action.

Assessment of Potential Operating Modes

Table 2 lists the highly potential operating modes with respect to various ambient temperatures and hybrid drive modes. It is important to realize that the operating mode of heater core plus boost pump turns out to be the highest potential to be used. This can be explained by the three key functions that boost pump can provide: (a) extending the capacity by increasing the coolant flow rate through heater core; (b) improving air temperature stability by damping the disturbance caused by the hybrid drive shifting; and (c) achieving the high efficiency, low power consumption operation throughout recovering waste heat from engine coolant. It can also be found in Table 2 that the heat pump

TABLE 1

Assessment of the Impacts of Ambient Temperature on Operating Modes

|  | Ambient Temperature (° C.) | Cabin Heating Requirement | System Heating Capability | Power Consumption | Efficiency | Operating Available |
|---|---|---|---|---|---|---|
| Heat Pump | −20 | Very High | Low | Very High | Very Low | ~40 min continuous operation |
| Heater Core | −20 | Very High | Very Low | Very Low | Very High | Very Low |
| Hybrid Heating | −20 | Very High | Medium | High | Low | Medium |
| Heat Pump | −10 | Very High | Low | Very High | Low | ~60 min continuous operation |
| Heater Core | −10 | Very High | Low | Very Lower | Very High | Medium |
| Hybrid Heating | −10 | Very High | Medium | High | Medium | High |
| Heat Pump | 0 | High | Medium | High | Medium | ~90 min continuous operation |
| Heat Core | 0 | High | Medium | Very Low | Very High | High |
| Hybrid Heating | 0 | High | High | Medium | High | Very High |
| Heat Pump | 10 | Medium | High | High | High | High |
| Heater Core | 10 | Medium | Very High | Very Low | Very High | Very High |
| Hybrid Heating | 10 | Medium | Very High | Medium | Very High | Very High |

As indicated in Table 1, cabin heating needs increase with the decrease of ambient temperature. For the independent operating mode, such as heat pump only or heat core only, the heating capacity and the operating availability exhibit the lowest rating at −20° C. ambient while the user is demanding the maximum heating requirements. Applying the hybrid heating, both the heating capability and the operating availability are improved to the rating "medium", which suggests the hybrid heating enables the system to be and boost pump tend to be used in the transient state operation due to low capacity and quick response, while heater core is then used for the steady state operation owing to its high capacity and slow reaction characteristics. It should be pointed out that only the highly possible operating modes are checked. Any operating mode listed in Table 2 could occur in a real world condition, which definitely requires a high level of the synergy of the control strategy.

TABLE 2

Potential Operating Modes of a Hybrid Heating System

| | Heater Core Only | Boost Pump Only | Heat Pump Only | Heater Core + Heat Pump | Heater Core + Boost Pump | Heat Pump + Boost Pump | Heat Core + Boost Pump + Heat Pump |
|---|---|---|---|---|---|---|---|
| −20° C. Steady-state | | | | X | X | | X |
| −20° C. Transient | | X | | | X | X | |
| −10° C. Steady-state | | | | X | X | | X |
| −10° C. Transient | | X | X | X | X | X | |
| 0° C. Steady-state | X | | | X | X | | X |
| 10° C. Transient | | X | X | X | X | X | |
| 10° C. Steady-state | X | | | | X | | |
| 10° C. Transient | | X | X | | X | X | |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for maintaining a desired temperature within the passenger compartment of a vehicle, said method comprising:

providing heat to the passenger compartment through the use of a dual heating system having a first heating system and a second heating system;

said first heating system circulating an engine coolant through a heater core, and said second heating system utilizing a heat pump system comprising a compressor for pressurizing an automobile refrigerant; and operating said first heating system, said second heating system, or both of said first and said second heating systems in response to an engine status of the vehicle, a desired temperature setting, an ambient temperature of the passenger compartment and an ambient temperature outside of the vehicle;

said first and second heating systems further being controlled by a control system utilizing a computer algorithm, said computer algorithm characterized by:

determining said engine status and comparing said engine status to a first predetermined parameter;

operating said second heating system without operating said first heating system if said engine status is outside a range defined by said first predetermined parameter;

operating said first heating system if said engine status is within said first predetermined parameter;

operating said second heating system in addition to said first heating system if said ambient temperature outside of the vehicle is below a second predetermined temperature or if said ambient temperature of the passenger compartment does not reach said desire temperature setting within a predetermined period of time; and discontinuing operation of said first heating system, said second heating system, or said first and second heating systems if said ambient temperature of the passenger compartment reaches said desired temperature setting within said predetermined period of time.

2. The method as in claim 1, wherein the vehicle is a hybrid vehicle utilizing an electric drive as well as an internal combustion engine.

3. A method for maintaining a desired temperature within a passenger compartment of a vehicle, comprising:

supplying heat to a passenger compartment through the use of a first heating system and a second heating system, said first heating system selectively circulating an engine coolant from an engine to a heater core, said second heating system utilizes a heat pump system comprising a compressor for pressurizing an automobile refrigerant;

monitoring the temperature of said engine coolant, the ambient temperature outside of the vehicle, and the temperature of the passenger compartment;

comparing the temperature of said coolant to a first predetermined value;

operating said second heating system without operating said first heating system if the temperature of said coolant is below said first predetermined value and the ambient temperature is below a predetermined ambient temperature value;

operating said first heating system and said second heating system if the temperature of said coolant is above said first predetermined value and if the ambient temperature outside said vehicle is below said predetermined ambient temperature value; and operating said first heating system and said second heating system if the temperature of the passenger compartment does not reach a desired temperature within a predetermined period of time.

4. The method as in claim 3, further comprising:

discontinuing operation of said first heating system or said second heating system, or both said first and second heating systems if said passenger compartment temperature reaches said desired temperature within said predetermined period of time.

5. The method as in claim 3, further comprising:

monitoring the flow of said engine coolant; and circulating said engine coolant by either a first pump, a second pump, or a combination of said first pump and said second pump, activation of said first pump and said second pump being dependant on the flow of said engine coolant, said first pump being driven by said engine, and said second pump being driven independent of said engine.

6. The method as in claim 5, wherein circulating said engine coolant further comprises:

opening an electronic control valve such that either said first pump or said second pump or both said first and second pumps circulate said engine coolant from said engine to said heater core.

7. The method as in claim 6, further comprising:

discontinuing operation of either said first heating system or said second heating system or said first and second heating systems if the temperature of the passenger compartment reaches said desired temperature within said predetermined period of time.

8. The method as in claim 3, further comprising:

monitoring the status of said engine;

activating a second pump to circulate said engine coolant if said engine is off or idling, wherein said engine drives a first pump to circulate said engine coolant and said second pump drives said engine coolant when said engine is off or idling.

* * * * *